United States Patent
Kondameedi et al.

(10) Patent No.: US 10,502,550 B2
(45) Date of Patent: Dec. 10, 2019

(54) METHOD OF NON-DESTRUCTIVE TESTING A CUTTING INSERT TO DETERMINE COATING THICKNESS

(71) Applicant: Kennametal Inc., Latrobe, PA (US)

(72) Inventors: Naveen Kumar Kondameedi, Latrobe, PA (US); Christoph Gey, Ligonier, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/386,295

(22) Filed: Dec. 21, 2016

(65) Prior Publication Data

US 2018/0172430 A1   Jun. 21, 2018

(51) Int. Cl.
| | |
|---|---|
| *G01B 11/06* | (2006.01) |
| *B23B 27/14* | (2006.01) |
| *B23K 101/34* | (2006.01) |
| *B23K 103/16* | (2006.01) |

(52) U.S. Cl.
CPC .......... *G01B 11/0616* (2013.01); *B23B 27/14* (2013.01); *B23B 2228/105* (2013.01); *B23K 2101/35* (2018.08); *B23K 2103/166* (2018.08)

(58) Field of Classification Search
CPC . G01B 11/0616; G01B 11/0625; G01B 11/24; G01B 21/08; G01B 11/06; G01B 7/105; G01B 11/028; G01B 7/06; G01B 7/066; B23K 26/40; B23K 26/0624; B23K 2203/166; B23K 2201/35; B23K 26/03; B23K 26/00; B23B 27/14; B23B 2228/105; B23B 2228/04; B23B 27/146; C23C 30/005; Y10T 407/24; Y10T 428/24529

See application file for complete search history.

(56) References Cited

U.S. PATENT DOCUMENTS

| | | | | |
|---|---|---|---|---|
| 5,643,523 | A * | 7/1997 | Simpson | B23B 27/145 264/400 |
| 5,655,422 | A * | 8/1997 | Stolz | B23B 29/0345 82/1.2 |
| 6,255,621 | B1 * | 7/2001 | Lundquist | G11B 5/102 219/121.69 |

(Continued)

OTHER PUBLICATIONS

Mirza et al. ("Ultrashort pulse laser ablation of dielectrics: Thresholds, mechanisms, role of breakdown", Nature, Dec. 19, 2016).*

(Continued)

*Primary Examiner* — Mohamed K Amara
(74) *Attorney, Agent, or Firm* — Matthew S. Bedsole

(57) ABSTRACT

A method for non-destructive testing a cutting insert to determine coating thickness id disclosed. The method includes the steps of using a source of electromagnetic energy to ablate a surface of the cutting insert to non-destructively form a geometric feature and expose the substrate and each layer of the coating; and measuring the thickness of each layer of the coating. In one example, the geometric feature is a groove with a generally trapezoidal shape. In other examples, the groove can have a U-shape, V-shape, and the like. The thickness of each layer of the coating is determined using focus variation, contrast detection, confocal microscopy, an interferometric microscopy, an imaging interferometric microscopy, or similar technique.

20 Claims, 2 Drawing Sheets

(56) References Cited

U.S. PATENT DOCUMENTS

| | | | | |
|---|---|---|---|---|
| 6,355,198 B1* | 3/2002 | Kim | B01J 19/0046 | 264/259 |
| 6,824,540 B1* | 11/2004 | Lin | A61F 9/008 | 128/898 |
| 6,864,570 B2* | 3/2005 | Smith | G02F 1/1362 | 257/701 |
| 6,998,173 B2* | 2/2006 | Liu | C22C 1/055 | 428/307.7 |
| RE43,605 E* | 8/2012 | O'Brien | B23K 26/032 | 264/400 |
| 2002/0084290 A1* | 7/2002 | Materna | B01L 3/0241 | 222/420 |
| 2004/0044355 A1* | 3/2004 | Nevyas | A61F 9/008 | 606/166 |
| 2006/0055504 A1* | 3/2006 | Pailthorp | H01C 17/242 | 338/195 |
| 2006/0195072 A1* | 8/2006 | Miller | A61B 18/20 | 606/2 |
| 2007/0117481 A1* | 5/2007 | Day | A61F 13/4902 | 442/50 |
| 2007/0298230 A1* | 12/2007 | Omori | B23B 27/141 | 428/212 |
| 2008/0039828 A1* | 2/2008 | Jimenez | A61B 18/24 | 606/13 |
| 2008/0070046 A1* | 3/2008 | Westergren | B23B 27/148 | 428/457 |
| 2009/0067938 A1* | 3/2009 | Omori | B23B 27/141 | 407/119 |
| 2009/0157064 A1* | 6/2009 | Hodel | A61B 18/22 | 606/10 |
| 2009/0162152 A1* | 6/2009 | Omori | B23B 27/141 | 407/113 |
| 2009/0269150 A1* | 10/2009 | Omori | B23B 27/141 | 407/114 |
| 2010/0037532 A1* | 2/2010 | Park | B23B 27/146 | 51/309 |
| 2010/0100084 A1* | 4/2010 | Girard | A61B 18/20 | 606/13 |
| 2010/0320179 A1* | 12/2010 | Morita | B28D 5/0011 | 219/121.69 |
| 2011/0020081 A1* | 1/2011 | Webb | B22F 7/06 | 407/115 |
| 2013/0092298 A1* | 4/2013 | Bregulla | B24B 5/185 | 148/565 |
| 2014/0185061 A1* | 7/2014 | Buller | G01B 11/0616 | 356/632 |
| 2014/0354085 A1* | 12/2014 | Gamet | B81B 3/0072 | 310/36 |
| 2015/0063380 A1* | 3/2015 | Liu | H01S 3/2383 | 372/6 |
| 2015/0231703 A1* | 8/2015 | Bjormander | B23B 27/146 | 428/162 |
| 2016/0089731 A1* | 3/2016 | Yang | B23K 26/0846 | 219/121.72 |
| 2016/0208379 A1* | 7/2016 | Satoh | C23C 16/403 | |
| 2016/0263659 A1* | 9/2016 | Takahashi | C23C 16/403 | |
| 2016/0332237 A1* | 11/2016 | Nakamura | C23C 16/403 | |
| 2016/0333473 A1* | 11/2016 | Stiens | C23C 16/34 | |
| 2017/0216929 A1* | 8/2017 | Shirochi | B23B 27/148 | |
| 2017/0256638 A1* | 9/2017 | MacElwee | H01L 29/7787 | |
| 2018/0044219 A1* | 2/2018 | Marjanovic | C03B 33/091 | |
| 2018/0068897 A1* | 3/2018 | Fukuyo | B23K 26/0057 | |
| 2018/0272432 A1* | 9/2018 | Jonsson | B23P 15/28 | |
| 2019/0154892 A1* | 5/2019 | Moldovan | G02B 5/1876 | |

OTHER PUBLICATIONS https://en.wikipedia.org/wiki/Scanning_confocal_electron_microscopy.*

"Femtosecond Micromachining Applications for Electro-Optic Components" to Leong et. al (2001); Electronic Components and Technology Conference.*

* cited by examiner

METHOD OF NON-DESTRUCTIVE TESTING A CUTTING INSERT TO DETERMINE COATING THICKNESS

FIELD OF THE INVENTION

In general, the invention relates to a cutting insert and, more particularly, to a method of non-destructive testing of a cutting insert to measure coating thickness of the cutting insert by using electromagnetic radiation to expose each layer of the coating, followed by measuring the thickness of each layer using commercial microscopy techniques, such as focus variation, contrast detection, confocal microscopy, interferometric microscopy, imaging interferometric microscopy, and the like.

BACKGROUND OF THE INVENTION

Cutting inserts with one or more layers of coating, for example, thin film physical vapor deposition (PVD), chemical vapor deposition (CVD) and thick hard coatings in the form of single or multilayer architectures has become standard practice for enhancing wear and corrosion resistance in the cutting tool industry. In production, coating quality is related to various aspects, such as: thickness, adhesion to the substrate, hardness, surface roughness, visual appearance, composition, microstructure, residual stresses, and the like. Depending on their intended application, hard coatings usually range from a few hundred nanometers up to about 50 micrometers in thickness. To consistently produce a coating of a certain thickness, a good control over the deposition rate and other process parameters is required. In the practice, process optimization is often aided by trial and error, or DOE's study of many parameters on a large sample set, thus making it necessary to perform coating thickness measurements on a regular basis.

This importance of coating thickness assurance has been widely reported in the literature. Besides being a key quality aspect in coated parts, thickness also influences the physical, thermal, mechanical, corrosion and tribological response of the coating/substrate system. In multilayer coatings, these properties have been related to the coating architecture, i.e., number, distribution, proportion, composition and thickness of the individual sublayers. Moreover, the residual stress state of the coating and its adhesion to the substrate are known to be thickness-dependent parameters. Thus, thickness continuity is a key aspect for quality control for a cutting insert having a single layer or a multilayer architecture.

Currently, there are three methods that are widely employed for measuring thickness of single and multilayer coating architectures, namely: Calotte Grinding Method (CGM), Glow Discharge Optical Emission Spectroscopy (GDOES), X-ray fluorescence and Metallographic Micro Polishing (MMP) followed by optical or scanning electron microscopy (SEM) analyses.

GDM is a micro-abrasive procedure in which coating thickness determination relies on the measurement of the circular projections of a calotte-shaped wear scar produced by a hard steel ball rotating freely against the specimen until the coating has been perforated. A micro-abrasive diamond suspension is delivered near the contact to ensure even surface wearing and well defined edges around the calotte.

GDOES is an advanced spectroscopic technique that allows the determination of chemical composition profiles as a function of depth from a few hundred nanometers up to about 50 micrometers. In this technique, the coated sample (cathode) is placed in a copper electrode (anode) and a discharge is set between them, thus producing erosion (sputtering) of the sample surface at a controlled rate. The released atoms are excited in Argon plasma and photons are emitted as they return to their fundamental energy level. These photons are subsequently collected and sent to an optical spectrometer consisting of an array of photomultipliers that quantify elemental concentrations as a function of the intensities of the photonic emissions. Therefore, the thickness of a coating may be estimated as the profile depth at which marked transitions occur between higher to lower atomic concentrations of the coating elements and lower to higher concentrations of the substrate elements.

MMP relies on the metallographic preparation of the coated sample by cross-section polishing, followed by coating thickness measurements using commercial microscopy techniques. The MMP specimens are typically hot mounted in an epoxy resin containing mineral and glass fillers that provide optimum planeness and excellent edge retention during the cross-sectional preparations. The grinding and polishing steps are conducted using a semi-automatic specimen mover installed on a disc-type metallographic machine, achieving a maximum sliding speed of around 30 mm/s. Plane grinding is performed using resin-bonded diamond abrasive disc, lubricated with water under a constant load, and fine grinding is done using grinding paper in several steps.

Due to their inherent differences, each method provides results at various levels of cost, accuracy and time. For instance, the high precision of MMP is the main advantage of this method. However, sample preparation is time consuming, which typically takes about forty minutes to prepare the sample and another fifteen minutes to measure the coating thickness. GDOES provides quick results, but the equipment and testing costs are high. The CGM is the quicker and less expensive.

Due to the amount of time necessary for each of these techniques, the current techniques only support the research and development phase of creating the coating architecture, rather than the manufacturing phase in which a sample lot of cutting inserts can be continuously inspected for quality control on a regular basis. In addition, if an inconsistency in the thickness of the coating is identified in a manufacturing lot, then the lot needs to be quarantined and inspected. Thus, there is a need to provide a method for measuring the thickness of one or more layers of coating of a cutting insert that can be performed in a timely, cost effective and non-destructive manner.

SUMMARY OF THE INVENTION

The problem of measuring the thickness of a single or multilayer coating of a cutting insert in a continuous flow operation in a timely and cost-effective manner is solved by using a source of electromagnetic energy, such as a picosecond or femtosecond laser, and the like, to form a geometric feature on the surface of the cutting insert and expose each layer of the coating, and then measuring the thickness of the one or more layers using basic trigonometric techniques.

Recently, femtosecond laser technology has commercially evolved as an industry work horse. When appropriately configured, this pulse duration holds a unique capability to ionize or ablate the material converting solid to vapor phase without initiating melting. If one can laser irradiate a 500 µm circular area or a 1 mm×500 um groove area on a coated cutting tool, it is possible to machine the surface without damaging the inherent layers that form the coating on a substrate. Depending on the wall angle of the circular or linear groove created, when optically measured at high magnification, we can apply basic trigonometry techniques to calculate the coating thickness.

One aspect of the invention is a method of non-destructive testing of a coated cutting insert (i.e. cutting tool) comprising the steps of ablating a surface of a coated cutting insert to form a geometric feature without damaging the inherent layers or initiating melting using ultrashort (femtosecond) laser pulses. Then, the cross section of the geometric feature is optically measured to quantify the individual layer thickness and/or total layer thickness. The method of the invention can be performed in a relatively short period as compared to conventional methods. Thus, the method of the invention has a very high potential for being integrated into manufacturing as an automated solution. In addition, the geometrical feature can be hidden in a logo, identification mark, and the like.

The thickness measurement is automatically captured and analyzed using an appropriate commercially available hardware and software. If correctly configured, the method of the invention can in-line measure coating thicknesses in the manufacturing plant (either the complete lot or a chosen sample size). The geometric feature can be formed as a step in regular processing of the cutting tool, which can be used at a later point of time for evaluation during a customer complaint or process monitoring in general.

In one aspect of the invention, a method for non-destructive testing a cutting insert comprising a substrate and one or more layers of coating, the method comprising:
    using a source of electromagnetic energy to ablate a surface of the cutting insert to form a geometric feature and expose a cross section of the substrate and each layer of the coating; and
    measuring the thickness of each layer of the coating.

In another aspect of the invention, a method for non-destructive testing a cutting insert comprising a substrate and one or more layers of coating, the method comprising:
    ablating a surface of a cutting insert by using a source of electromagnetic energy to expose the substrate and each layer of a coating of the cutting insert, thereby forming a geometric feature on the surface of the cutting insert; and
    measuring the thickness of each layer of the coating.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
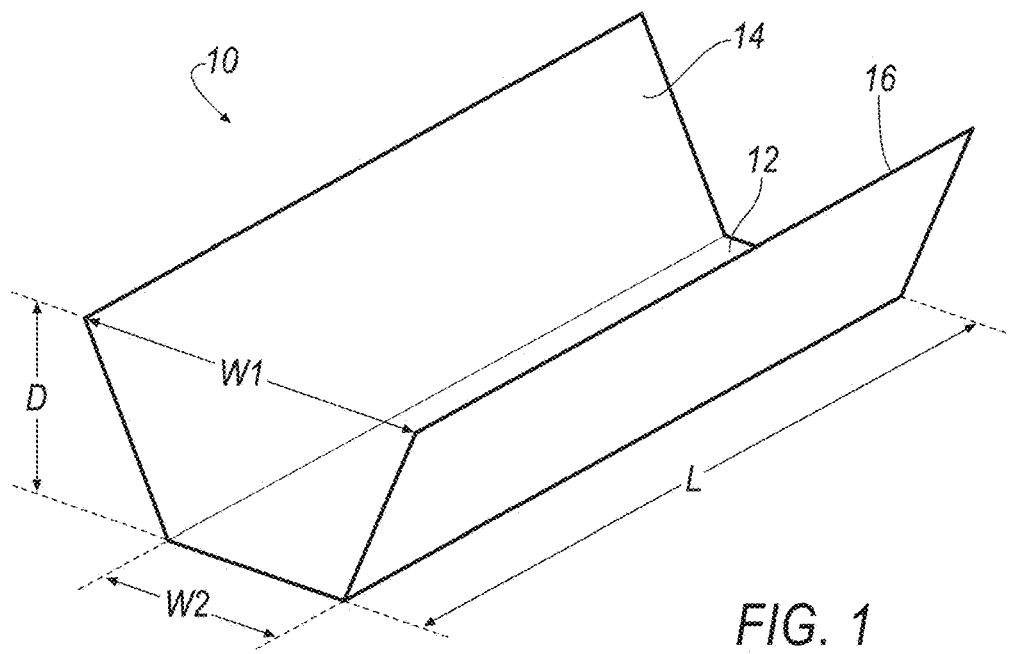
FIG. 1 is an isometric view of a geometric feature, such as a trapezoidal-shaped groove formed on the surface of the cutting insert using a femtosecond laser according to an embodiment of the invention.

In general, the non-destructive method of the invention comprises the steps of: 1) using a source of electromagnetic energy, such as a femtosecond laser, and the like, to ablate the surface of the cutting insert to form a geometric feature and expose a cross section of the one or more layers of a coating; and 2) measuring the thickness of the one or more layers by examination of the cross section using conventional microscopy techniques.

One technique of forming the groove through the one or more coating layers is by using electromagnetic energy, such as a short pulse picosecond laser, short pulse femtosecond laser, and the like. Short pulse lasers have undergone a rapid growth both in capability and application since the advent of chirped pulse amplification. Initially driven by cutting-edge fundamental research, the development of femtosecond lasers has now interlinked with many industrial metrology, research, and clinical applications. Further, by enabling action on matter in a controlled way at the nanometer scale and by opening the possibility of monitoring events at the femtosecond resolution, ultrashort lasers have provided physics, chemistry, and biology with research tools of unexpected power. Generating and manipulating femtosecond laser pulses require the ability to limit pulse lengthening and spectral distortion.

However, a new generation of femtosecond lasers have been developing for several years. Based on Ytterbium doped gain media, they can be pumped by diode and the result is compact low cost femtosecond lasers that can generate output energies higher than those obtained with a conventional lasers TiSa. Typical wavelengths of these lasers are near 1030 and 1050 nm with a spatially Gaussian beam profile. The pulse duration can be varied from 500 to 3000 fs and is controlled with an autocorrelator. The laser can operate with a repetition rate of 1 Hz to 100 kHz, with a maximum energy of 1 mJ at 1 Hz and 38 µJ at 100 kHz. A post-compression module allows to reach a pulse duration lower than 100 fs with an energy of 1 µJ at 100 kHz. It will be appreciated that the invention is not limited by specific operating parameters, such as repetition rate, maximum energy and pulse duration, and that the invention can be practiced with any desirable operating parameters sufficient to ablate the surface of the cutting insert in a non-destructive manner.

The laser beam (linearly polarized) is focused at normal incidence, or with a specific angle if needed, on the front face of a coated sample by a plano-convex lens or a catodioptric objective. A He-Ne laser can be used for alignments. Accurate positioning of the focus plane of the sample surface is performed by a precision translation stage. The measurement of the focused beam is realized with a beam analyzer associated with an imaging system.

The geometric feature on the surface of the cutting insert can be formed using a femtosecond laser that is commercially available from GFH, GmbH of Deggendorf, Germany.[1] The machine, the laser source and the different processing modules are controlled by a single and uniform interface. This allows an intuitive operation of the machine and enables to control and monitor all process parameters in real-time. Therefore, the process development and resulting applications can be done very effective and in a short period.

[1] https://gfh-gmbh.de/en/machine-building/gl-evo

Machine Configuration
Laser: TruMicro 5050[2]
Wavelength λ: 1030 nm
Power: 50 W
Frequency: 200 kHz-800 kHz
Pulse length: 900 fs Focusing optics: f=100 mm

Figure 2:
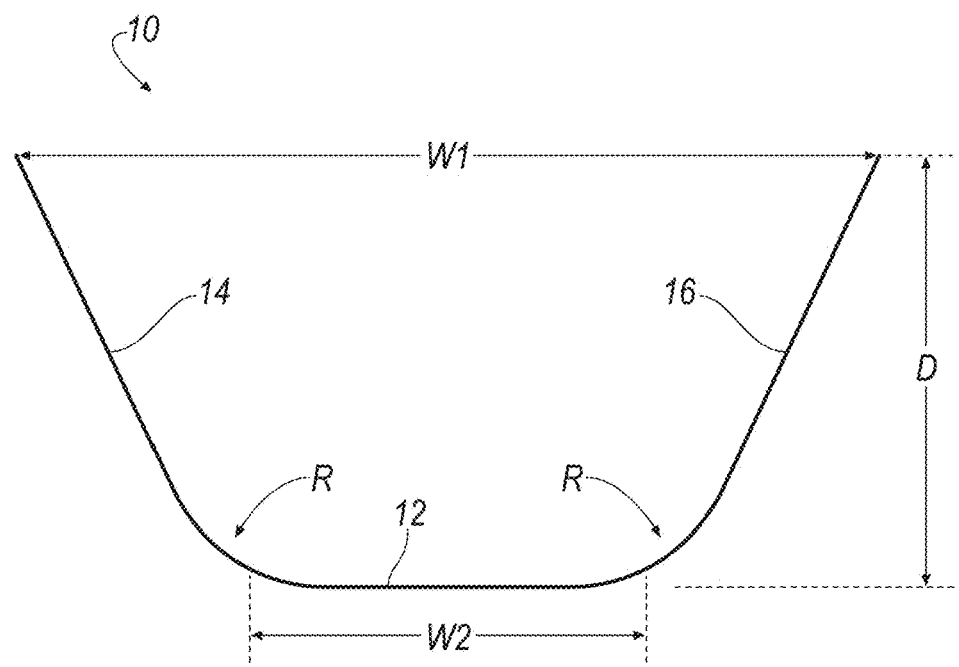
FIG. 2 is an end view of the geometric feature of FIG. 1.
Figure 3:
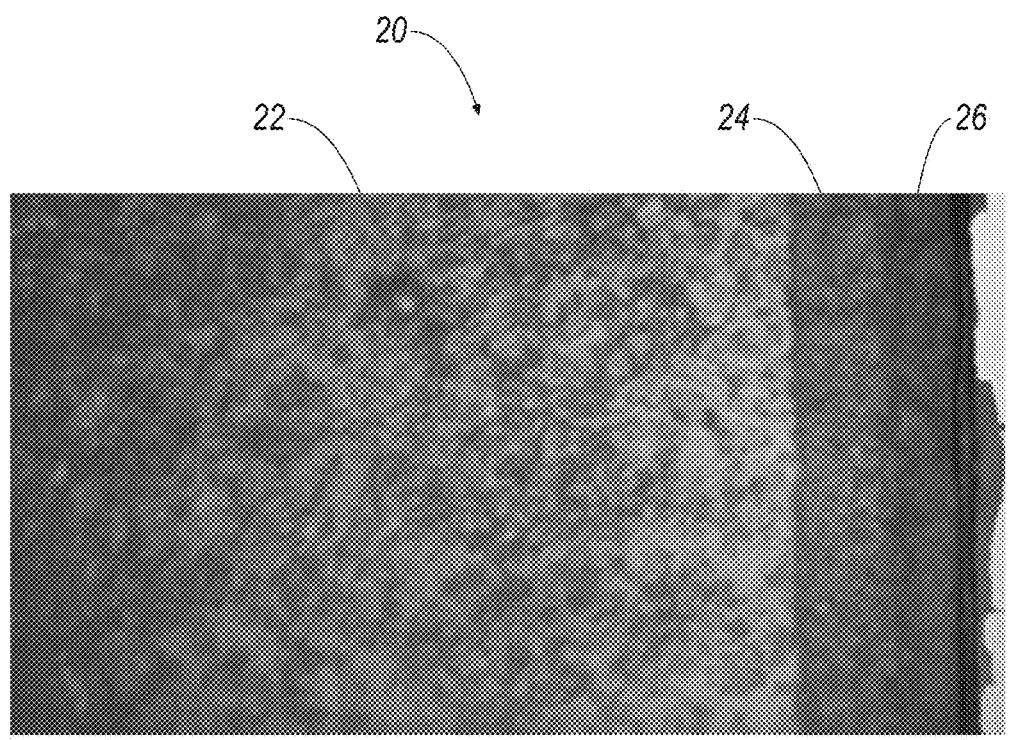
FIG. 3 is a photo micrograph of a cross section of a geometric feature formed by using a femtosecond laser according to an embodiment of the invention.

[2] http://www.trumpf-laser.com/en/products/solid-state-lasers/short-and-ultra-short-pulsed-lasers/trumicro-series-5000.html Parameters Used Wavelength λ: 1030 nm Power: 20 µJ Effective frequency: 200 kHz Feed rate: 1000 mm/s Runtime: 7 s Referring now to FIGS. 1 and 2, one aspect of the invention is that the geometrical feature 10 is in the form of a groove, furrow, channel, and the like, having a bottom 12 and a pair of angled side walls 14, 16. In one embodiment, the groove 10 is trapezoidal in shape with a length, L, of about 300-500 µm, a width, W1, at the surface of the insert of about 150-200 µm, a width, W2, at the bottom 12 of the groove 10 of about 100 µm and a depth, D, of about 50-75 µm, as shown in FIGS. 1 and 2. Optionally, the intersection between the bottom 12 and the side walls 14, 16 of the groove 10 may be formed with a radius, R, as shown in FIG. 2.

It will be appreciated that the depth, D, of the groove 10 is sufficient to expose the single layer and/or multilayer coating of the cutting insert. Ideally, the depth, D, of the groove 10 is about 5-10 µm larger than the total thickness of the coating. For example, the depth, D, of the groove 10 may be about 50 µm for a coating having a total thickness of between about 30-40 µm. In addition, it will be appreciated that the invention is not limited to a trapezoidal shaped groove, and that the invention can be practiced with other types of groove shapes, such as a U-shaped groove, a V-shaped groove, and the like.

The geometrical feature, such as the groove 10, can be formed on the surface of the cutting insert such that the groove 10 is hidden. For example, the groove 10 can be formed in a logo, grade code, an identification mark, or other indicia on the surface of the cutting insert.

It will be appreciated that the invention is not limited by the geometrical feature in the form of a groove, and that the invention can be practiced with other geometrical features, such as a circular feature, such as a round cavity, and the like.

Once the geometric feature is formed on the surface of the cutting insert, the next step is to measure the thickness of each of the exposed layers of the single layer or multilayer coating. One technique of measuring the thickness of each of the layers is by using a digital image obtained from a commercially available microscopy techniques, such as focus variation, contrast detection, confocal microscopy, interferometric microscopy, imaging interferometric microscopy, and the like.

Focus variation is a method to calculate a sharp image and to measure the depth with an optics with limited depth of field.

The algorithm works as follows:
1. Images with difference focus are captured. This is done by moving the sample or the optics in relation to each other.
2. The focus over each plane is calculated for each position.
3. The plane with the best focus is used to get a sharp image. The corresponding depth gives the depth at this position.

Confocal microscopy, commonly known as confocal laser scanning microscopy (CLSM), is an optical imaging technique for increasing optical resolution and contrast of a micrograph by means of adding a spatial pinhole placed at the confocal plane of the lens to eliminate out-of-focus light. It enables the reconstruction of three-dimensional structures from sets of images obtained at different depths (a process known as optical sectioning) within a thick object. This technique has gained popularity in the scientific and industrial communities and typical application are in life sciences, semiconductor inspection and materials science.

The principle of confocal imaging was patented in 1957 by Marvin Minsky[3] and aims to overcome some limitations of traditional wide-field fluorescence microscopes. In a conventional (i.e. wide-field) fluorescence microscope, the entire specimen is flooded evenly in light from a light source. All parts of the specimen in the optical path are excited at the same time and the resulting fluorescence is detected by the microscope's photodetector or camera including a large unfocused background part. In contrast, a confocal microscope uses point illumination (see Point Spread Function) and a pinhole in an optically conjugate plane in front of the detector to eliminate out-of-focus signal—the name "confocal" stems from this configuration. As only light produced by fluorescence very close to the focal plane can be detected, the image's optical resolution, particularly in the sample depth direction, is much better than that of wide-field microscopes. However, as much of the light from sample fluorescence is blocked at the pinhole, this increased resolution is at the cost of decreased signal intensity—so long exposures are often required. To offset this drop in signal after the pinhole, the light intensity is detected by a sensitive detector, usually a photomultiplier tube (PMT) or avalanche photodiode, transforming the light signal into an electrical one that is recorded by a computer. U.S. Pat. No. 3,013,467.

As only one point in the sample is illuminated at a time, 2D or 3D imaging requires scanning over a regular raster (i.e., a rectangular pattern of parallel scanning lines) in the specimen. The beam is scanned across the sample in the horizontal plane by using one or more (servo controlled) oscillating mirrors. This scanning method usually has a low reaction latency and the scan speed can be varied. Slower scans provide a better signal-to-noise, resulting in better contrast and higher resolution.

The achievable thickness of the focal plane is defined mostly by the wavelength of the used light divided by the numerical aperture of the objective lens, but also by the optical properties of the specimen. The thin optical sectioning thin possible makes these types of microscopes particularly good at 3D imaging and surface profiling of samples.

Confocal microscopy provides the capacity for direct, noninvasive, serial optical sectioning of intact, thick, living specimens with a minimum of sample preparation as well as a marginal improvement in lateral resolution. Biological samples are often treated with fluorescent dyes to make selected objects visible. However, the actual dye concentration can be low to minimize the disturbance of biological systems: some instruments can track single fluorescent molecules. Also, transgenic techniques can create organisms that produce their own fluorescent chimeric molecules (such as a fusion of GFP, fluorescent protein with the protein of interest).

Interferometric microscopy or Imaging interferometric microscopy is the concept of microscopy which is related to holography, synthetic-aperture imaging, and off-axis-dark-field illumination techniques. Interferometric microscopy allows enhancement of resolution of optical microscopy due to interferometric (holographic) registration of several partial images (amplitude and phase) and the numerical combining.

In interferometric microscopy, the image of a micro-object is synthesized numerically as a coherent combination of partial images with registered amplitude and phase. For registration of partial images, the conventional holographic set-up is used, with the reference wave, which is usual for the optical holography. The multiple exposition allows the numerical emulation of a large Numerical Aperture objective, at moderate values of the Numerical Aperture of the objective used to register partial images. Similar techniques allow scanning and precise detection of small particles. As the combined image keeps both amplitude and phase information, the interferometric microscopy can be especially efficient for the phase objects, allowing detection of light variations of index of refraction, which cause the phase shift or the light passing through for a small fraction of a radian.

As described above, a non-destructive method of determining the thickness of a coating on a cutting insert comprising forming a geometric feature on the surface of the cutting insert to expose a cross section of the substrate and single or multilayer coating, and then using a conventional microscopic measurement technique to determine the thickness of each of the layers. In one aspect, the geometric feature, such as a groove, is formed using a picosecond laser or femtosecond laser. It is noted that the time required to form the geometric feature using the picosecond or femtosecond laser is about 7 seconds or less, and the time for determining the thickness of each layer is about one minute or less, thereby enabling continuous inspection of the cutting insert.

The patents and publications referred to herein are hereby incorporated by reference.

Having described presently preferred embodiments the invention may be otherwise embodied within the scope of the appended claims.

What is claimed is:

1. A method for non-destructive testing of a cutting insert to maintain performance of the insert after the non-destructive testing, the cutting insert comprising a substrate and one or more layers of coating, the method comprising:
   ablating the substrate and the one or more layers of coating of the cutting insert by using a source of electromagnetic energy, thereby forming a geometric feature having a depressed region in the surface of the cutting insert, the depressed region exposing each layer of the one or more layers of coating; and
   measuring a thickness of each layer of the one or more layers of the coating at the depressed region.

2. The method of claim 1, wherein the source of electromagnetic energy comprises a picosecond laser or a femtosecond laser.

3. The method of claim 2, wherein the femtosecond laser operates at a wavelength of 1030 nm, a power of 50 W, a frequency in a range between 200 kHz and 800 kHz, and a pulse length of 900 fs.

4. The method of claim 1, wherein the geometric feature is in the form of a groove, furrow, channel, or cavity.

5. The method of claim 1, wherein the depressed region has a trapezoidal shape.

6. The method of claim 1, wherein the depressed region has a V-shape.

7. The method of claim 1, wherein the depressed region is formed in 7 seconds or less.

8. The method of claim 1, wherein a depth of the depressed region is between 5 µm and 10 µm larger than a thickness of the coating being measure.

9. The method of claim 1, wherein a depth of the depressed region is between 50 µm and 75 µm.

10. The method of claim 1, wherein the thickness of each layer is measured using one of a focus variation technique, a contrast detection technique, a confocal microscopy technique, an interferometric microscopy technique and an imaging interferometric microscopy technique.

11. A method for non-destructive testing of a cutting insert to maintain performance of the insert after the non-destructive testing, the cutting insert comprising a substrate and one or more layers of coating, the method comprising:
    ablating the substrate and the one or more layers of coating of the cutting insert by using a source of electromagnetic energy, thereby forming a geometric feature having a depressed region in the surface of the cutting insert, the depressed region having a bottom defined by an exposed portion of the substrate, the depressed region exposing a cross section of each layer of the one or more layers of coating; and
    measuring a thickness of the exposed cross section of each layer of the one or more layers of coating at the depressed region.

12. The method of claim 11, wherein the geometric feature is in the form of a groove, furrow, channel, or cavity.

13. The method of claim 11, wherein the depressed region has a trapezoidal shape.

14. The method of claim 11, wherein the depressed region has a V-shape.

15. The method of claim 11, wherein the depressed region is formed in 7 seconds or less.

16. The method of claim 11, wherein a depth of the depressed region is between 5 µm and 10 µm larger than a thickness of the coating being measure.

17. The method of claim 11, wherein a depth of the depressed region is between 50 µm and 75 µm.

18. A method for non-destructive testing of a cutting insert to maintain performance of the insert after the non-destructive testing, the cutting insert comprising a substrate and a first coating layer, the method comprising:
    ablating the first coating layer of the cutting insert by using a source of electromagnetic energy, thereby forming a geometric feature having a depressed region in the surface of the cutting insert, the depressed region exposing a cross section of the first coating layer; and
    measuring a thickness of the exposed cross section of the first coating layer at the depressed region.

19. The method of claim 18, wherein the geometric feature is in the form of a groove, furrow, channel, or cavity.

20. The method of claim 18, wherein the cutting insert further comprises a second coating layer.

* * * * *